United States Patent [19]

Ito et al.

[11] 4,454,381
[45] Jun. 12, 1984

[54] METHOD AND A DEVICE FOR CONNECTING ELECTRIC CABLES USED IN A HYDRAULIC SYSTEM

[75] Inventors: Yasunobu Ito; Nobuaki Miki, both of Aichi, Japan

[73] Assignee: Aisin Warner Kabushiki Kaisha, Aichi, Japan

[21] Appl. No.: 411,068

[22] Filed: Aug. 24, 1982

[30] Foreign Application Priority Data

Aug. 31, 1981 [JP] Japan ................................. 56-136747

[51] Int. Cl.³ ........................ H02G 3/22; H01R 43/00
[52] U.S. Cl. ..................................... 174/151; 29/858; 174/77 R; 174/65 R
[58] Field of Search ....................... 29/857, 858, 869; 174/77 R, 18, 65 R, 151, 152 R; 339/103 M, 143, 117 R, 96, 118 R, 89 M, 218 M, 186 M

[56] References Cited

U.S. PATENT DOCUMENTS

| | | |
|---|---|---|
| 1,742,312 | 1/1930 | Hagel . |
| 2,605,315 | 7/1952 | Hargett . |
| 2,735,993 | 2/1956 | Humphrey . |
| 3,413,407 | 11/1968 | Potter . |
| 3,643,207 | 2/1972 | Cairns . |
| 3,845,552 | 11/1974 | Waltz . |
| 4,193,655 | 3/1980 | Herrmann, Jr. . |
| 4,266,844 | 5/1981 | Chelminski . |
| 4,335,932 | 6/1982 | Herrmann, Jr. . |

FOREIGN PATENT DOCUMENTS 816990 11/1957 United Kingdom .
1558657 1/1978 United Kingdom .

*Primary Examiner*—Howard N. Goldberg
*Assistant Examiner*—Carl J. Arbes
*Attorney, Agent, or Firm*—Blum, Kaplan, Friedman, Silberman & Beran

[57] ABSTRACT

A connector for electric cables used in a hydraulic control system of an automatic transmission includes a sealing member comprising a cylindrical sealing outer cylinder adapted to be fixed in a hole formed in the housing of the hydraulic control system and a sealing partition member having a short cylinder of a small diameter and a plurality of partition walls extending radially from the short cylinder, and two rubber bushings. The free ends of Teflon coated cables, are pulled out through the hole in the housing and are passed through through holes, respectively, of a rubber bushing. The free ends of polyethylene coated cables, are passed through through holes, respectively, of the other rubber bushing, are pulled out through the cavity of the outer cylinder, and are electrically connected to the respective free ends of the corresponding Teflon coated cables by means of joint terminals. The cables thus connected are adjusted so that each joint terminal is disposed within a space defined by radially extending partition walls of the partition member and the inside surface of the outer cylinder. Then one rubber bushing is tightly inserted into one end of the outer cylinder. A synthetic resin filler is poured through the bore of the short cylinder of the sealing partition member to fill up the space around the junctions of the cables formed with the joint terminals. After an appropriate amount of filler has been filled in the space, the other rubber bushing is inserted tightly into the other end of the outer cylinder. Finally, the sealing member is pushed in and securely held in the hole of the housing.

16 Claims, 12 Drawing Figures

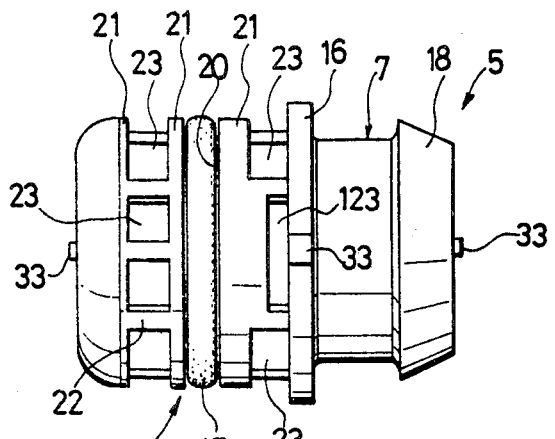
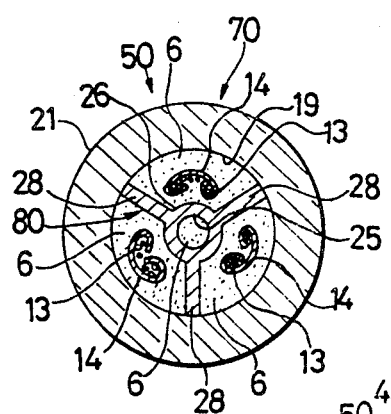
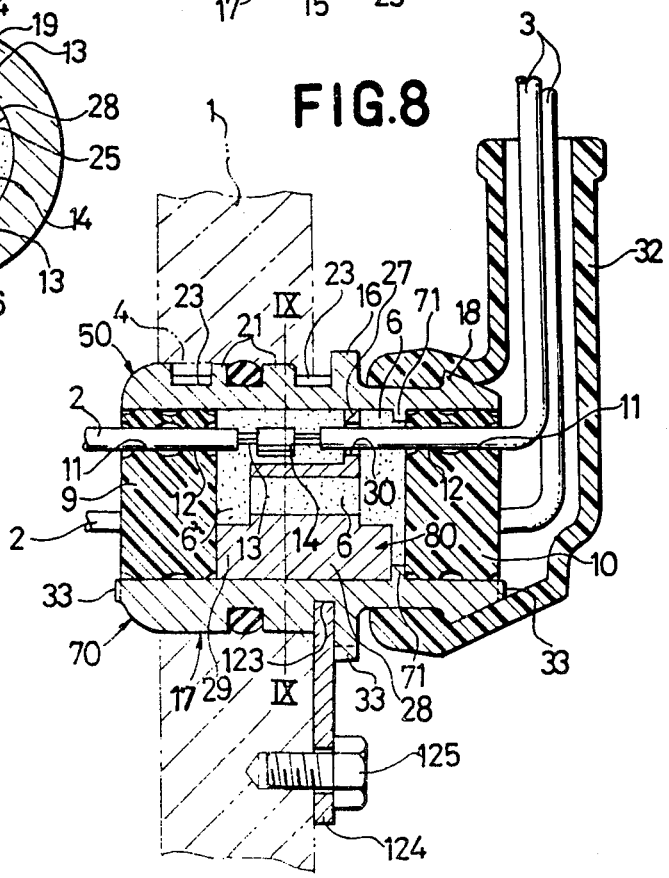

METHOD AND A DEVICE FOR CONNECTING ELECTRIC CABLES USED IN A HYDRAULIC SYSTEM

BACKGROUND OF THE INVENTION

This invention relates to a method and a device for connecting in a liquid-tight manner electric cables connected to electrical devices adapted to operate within the housing of hydraulic machinery, and electric cables connected to controllers disposed outside of a housing at a cable lead-out portion in the housing. The invention also relates to prevention of fluid leakage from the inside to the outside of the housing through the cables and the instrusion of foreign matters, such as water, from the outside into the inside of the housing.

In hydraulically controlled machinery in a hydraulic system, electrical devices are often operated while immersed in a hydraulic fluid. In a hydraulic control system of an automatic transmission, for instance, a solenoid valve is immersed in the hydraulic fluid and is adapted to operate under control of an electronic controller located outside the housing of the hydraulic control system so as to control the shift valve and other components of the hydraulic control system by maintaining the pressure of the hydraulic fluid in the shift valve and other components, or by reducing the pressure by draining the hydraulic fluid.

Electric cables coated with polytetrafluoroethylene, which is designated as Teflon (trade name), referred to hereinafter as Teflon cables, are used for transmitting command signals to such electrical devices which operate while immersed in a hydraulic fluid, because the temperature of the hydraulic fluid often rises to a very high temperature during operation of the hydraulic control system. This coating material, Teflon, has excellent heat-resisting and oil-resisting properties and Teflon cables are durable for extended service in the hydraulic fluid. However, Teflon cables are extremely expensive as compared with ordinary rubber-coated, synthetic rubber-coated or polyethylene-coated electric cables, referred to hereinafter simply as polyethylene cables.

Further, since a Teflon cable or a polyethylene cable is formed by closely coating many intertwisted copper wires with a tubular coating layer, the Teflon cable and the polyethylene cable have a drawback in that hydraulic fluid leaks outside of the housing along the interior of the cable through gaps between the cable coating and the copper wires and through gaps between the component copper wires due to capillarity. This occurs even if a perfectly liquid-tight sealing is provided between the opening of the lead-out portion of the housing and the cable, when a single cable connected at one end thereof to an electrical device disposed within the housing, is passed through the opening and is connected at the other end thereof to a controller.

What is needed is a device for connecting electric cables in a hydraulic system which provides a leak-tight connection under adverse conditions of temperature and exposure and is economical in construction.

SUMMARY OF THE INVENTION

Generally, speaking, in accordance with the invention, a liquid tight seal for a housing containing fluid in a hydraulic system is provided.

The invention provides a method and a device for connecting electric cables in a liquid-tight manner in a hydraulic system. Therein a sealing member comprising a hollow and cylindrical sealing outer cylinder, which is opened at the opposite ends thereof, and a sealing partition member consisting of a hollow short cylinder of a smaller diameter and of an axial length which is shorter than that of the sealing outer cylinder disposed coaxially within the outer cylinder are used. The invention further includes an annular first partition wall extending within a plane practically perpendicular to the center axis of the short cylinder at one end of the short cylinder for connecting the outer circumference of the short cylinder and the inner circumference of the outer cylinder.

The device also includes second partition walls radially extending within planes including the center axis of the short cylinder and distributed along the circumferential direction practically at the same angular intervals for connecting the outer circumference of the short cylinder to the inner circumference of the outer cylinder, and a plug member made of an elastic material, such as soft rubber or a synthetic rubber, particularly in the shape of a cylinder and provided with a predetermined number of through holes distributed along the circumferential direction practically at the same intervals and practically in parallel to the center axis thereof.

Either one of a predetermined number of cables, electrically connected at the respective ends thereof to an electrical device which operates within the housing of a hydraulic machine in a hydraulic system or cables electrically connected at the respective ends to a controller located outside of the housing, are inserted through the through holes of the plug member while the other cables are inserted through the holes formed in the first partition wall. The coatings are stripped from the respective free ends of those cables and the corresponding ends of the cables are electrically connected. The junctions of the cables are positioned in spaces defined by the second partition walls and the outer circumference of the short cylinder of the sealing partition member and the inner circumference of the outer cylinder. The plug member is resiliently and fixedly fitted in one end of the outer cylinder with an axial space between the plug member and one end of the short cylinder.

Then a fluidized insulating, heat-resisting and oil-resisting synthetic resin filler is poured into the central axial bore of the short cylinder through one end thereof.

The filler is allowed to flow into spaces defined by the second partition walls, the outer circumference of the short cylinder and the inner circumference of the outer cylinder through the space formed between the plug member and one end of the short cylinder for filling up the spaces. At least the cavity of the outer cylinder formed between the plug member and the first partition wall is filled up with the filler. Finally, the sealing member is fitted in and fixed to the hole formed in the lead-out portion of the housing in a liquid-tight manner after the filler has been solidified.

Accordingly, it is an object of this invention to provide an improved method and device for connecting electrical cables in a hydraulic system which prevent the leakage of a hydraulic fluid contained in a housing through the interior of an electric cable, by using separate electric cables, one connected to an electrical device disposed within the housing of hydraulic machinery while the other is connected to a controller disposed outside of the hydraulic machinery, and by connecting the corresponding cables, placing the junction of cables, and by sealing gaps between the component wires of the cables with an insulating and heat-resisting synthetic resin filler by filling up the space around the junction of those cables with the synthetic resin filler within a sealing member which is attached in a liquid-tight manner to the opening of the lead-out portion of the housing.

Another object of this invention is to provide an improved method and device for connecting electric cables used in a hydraulic system which is reliable and economical in construction.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanied drawings, in which:

FIG. 7 is a front elevation of the sealing member of FIG. 3, FIG. 8 is an axial sectional view of an alternative embodiment of a cable connecting device in accordance with the invention, FIG. 9 is a cross-sectional view taken along a line IX—IX of FIG. 8.

DESCRIPTION OF THE PREFERRED EMBODIMENTS

Figure 1:
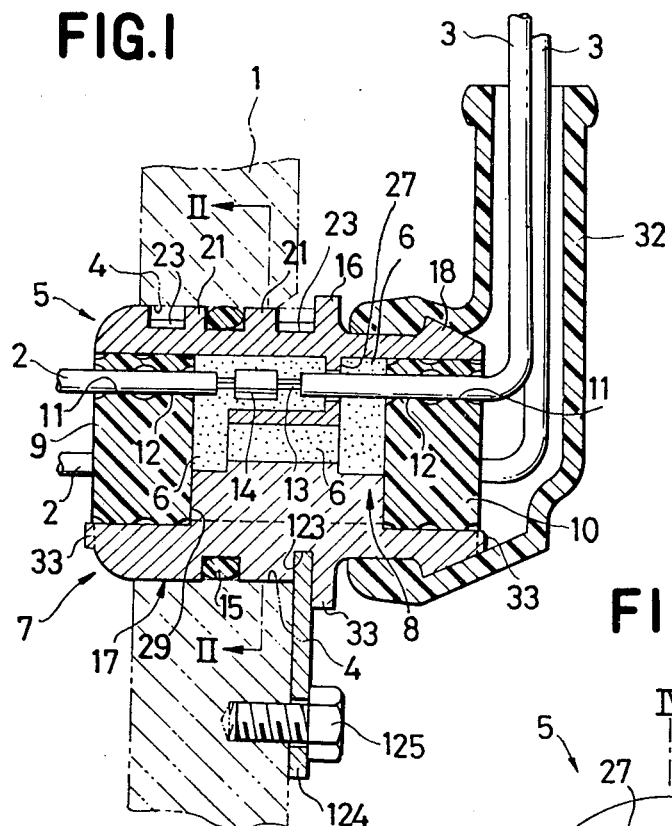
FIG. 1 is an axial sectional view of a cable connecting device in accordance with the invention.

Referring to FIG. 1, three electric cables 2 to be connected to an electrical device (not shown) which operates in a housing 1, and three electrical cables 3 to be connected to a controller (not shown) disposed outside of the housing 1 are electrically connected within a sealing member 5 attached to a hole 4 formed in the lead-out portion of the housing 1 and the space around the junction of the cables is filled with a synthetic resin filler 6.

The sealing member 5 includes a sealing outer cylinder 7 and a sealing partition member 8, which will be described in detail afterward. Cylindrical plug members 9,10 made of an elastic material, such as soft rubber or a synthetic rubber, are fitted in the opposite opening ends of the sealing outer cylinder 7 axially of the sealing outer cylinder 7 and resiliently fixed thereto. Three through holes 11 extending along the axial direction are formed in each of the plug members 9,10 practically at the same circumferential intervals for receiving the electric cables 2,3 therein. Annular protrusions 12 are formed on the inside surface of each of the through holes 11 of the plug members 9,10 in order to provide an increased surface pressure for the interfaces between the plug members 9,10 and the electric cables 2,3 for attaining liquid-tight sealing. Similar annular protrusions are formed concentrically and axially at the corresponding positions with respect to the annular protrusions 12 on the cylindrical outer circumference of the plug members 9,10 in order to provide an increased surface pressure for the interface between the plug member 9,10 and the sealing outer cylinder 5 for attaining liquid-tight sealing.

Figure 2:
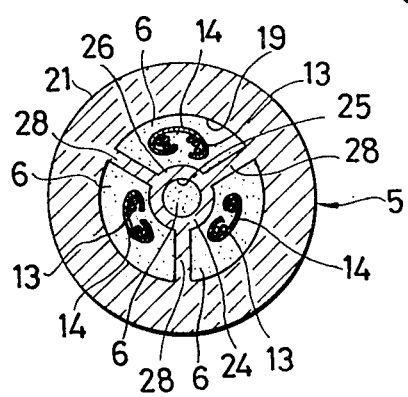
FIG. 2 is a cross-sectional view taken along a line II—II of FIG. 1.

The coatings of the corresponding ends of the electric cables 2,3 are stripped off to expose the component copper wires 13 and each pair of the corresponding ends 13 of the electric cables 2,3 are inserted into a C-shaped joint terminal 14 formed of a metal plate. The electric cables 2,3 are electrically joined by staking or crimping the joint terminal 14 (FIG. 2). An O-ring 15 is provided on the outer circumference of the sealing outer cylinder 7 for liquid-tight engagement between the outer cylinder 7 and the hole 4 of the housing 1.

Figure 3:
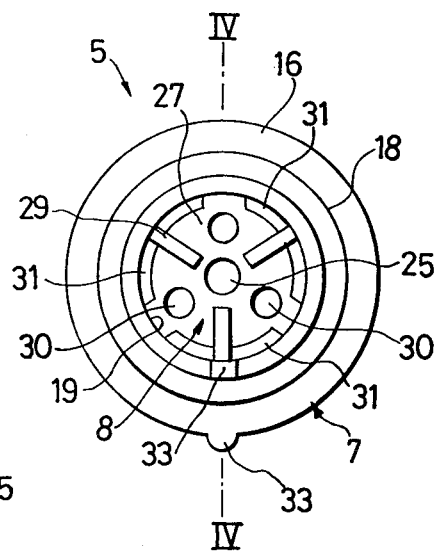
FIG. 3 is a right side elevation of the sealing member employed in the embodiment of FIG. 1.
Figure 4:
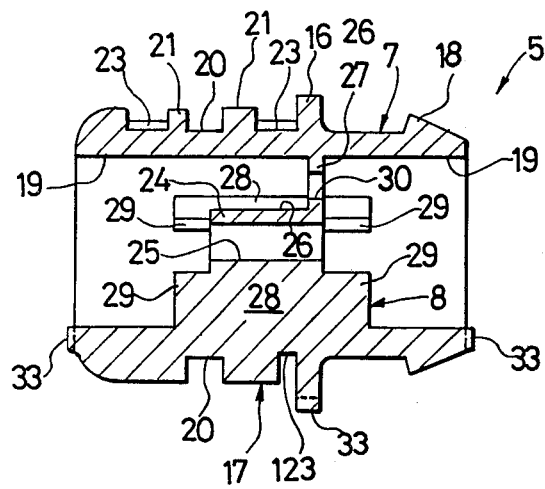
FIG. 4 is an axial sectional view taken along a line IV—IV of FIG. 3.
Figure 5:
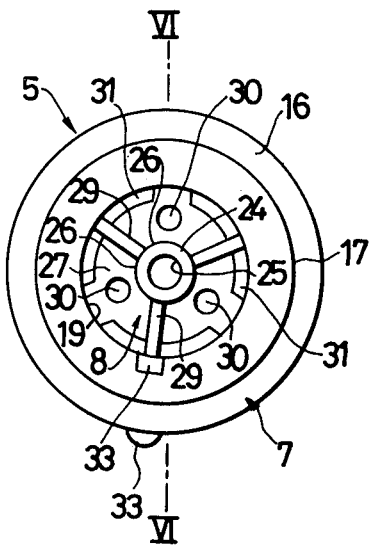
FIG. 5 is a right side elevation of the sealing member of FIG. 3.
Figure 6:
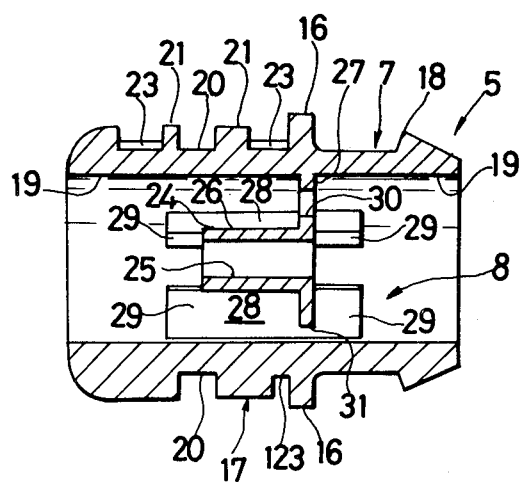
FIG. 6 is an axial sectional view taken along a line VI—VI of FIG. 5.

The sealing member 5 is formed of a synthetic resin, such as nylon 66, having oil-resistance, heat resistance, moderate elasticity and excellent strength. An exemplary construction of the sealing member 5 is illustrated in detail in FIGS. 3 to 7. FIG. 3 is a right side elevation of the sealing member 5. FIG. 4 is a sectional view taken along a line IV—IV of FIG. 3. FIG. 5 is a left side elevation of the sealing member 5. FIG. 6 is a sectional view taken along a line VI—VI of FIG. 5. FIG. 7 is a front elevation of the sealing member 5.

The sealing outer cylinder 7 is formed in a hollow cylinder having open opposite ends, and having a radially extending flange 16 formed on the outer circumference thereof, a circumferential fitting position 17 formed on one side of the flange 16 for fitting engagement with the hole 4 formed in the lead-out portion of the housing 1, an annular protrusion 18 of a triangular section formed on the other side of the flange 16 and a cavity defined by a cylindrical inside surface 19. The practically central portion of the circumferential fitting portion 17 is recessed in an annular shape along the circumference to form an annular groove 20 for receiving an O-ring 15, and circumferential annular ribs 21 are formed on both sides of the annular groove 20. Ribs 22 are formed perpendicularly to the annular ribs 21. Recesses 23 are defined by the ribs 21,22. When the outer cylinder 7 of the sealing member is fitted in the hole 4 with the circumferential fitting portion 17 in fitting engagement with the hole 4, the elasticity of the ribs 21,22 serves to firmly retain the outer cylinder 7 in the hole 4. A straight groove 123 is formed in the circumferential fitting portion 17 at a position adjacent to the flange 16. A key plate 124 is fixed to the housing 1 with a bolt 125 with one side end portion thereof fitted in the groove 123 for preventing the rotation and axial movement of the sealing member 5.

The sealing partition member 8 comprises of a hollow short cylinder 24 of a length shorter than that of the outer cylinder 7 having a center bore 25 of a very small diameter opening at the opposite ends and disposed in the outer cylinder 7 concentrically with the inside surface 19 thereof. The partition member 8 also comprises an annular first partition wall 27 formed at one end of the short cylinder 24 in a plane practically perpendicular to the center axis of the short cylinder 24 for connecting the outer circumference 26 of the short cylinder 24 and the inside surface 19 of the outer cylinder 7, and three plate-shaped second partition walls 28 formed in planes including the center axis of the short cylinder 24 and practically at the same angular intervals around the center axis of the short cylinder 24 for connecting the outer circumference 26 of the short cylinder 24 and the inside surface 19 of the outer cylinder 7. The second partition walls 28 are extended in a small measure axially of the short cylinder 24 from both ends of the short cylinder to form stopper portions 29. The first partition wall 27 has axial through holes 30 formed in sections defined by every two adjacent second partition walls 28 and small openings 31 formed on the circumference thereof on both sides of each stopper portion 29 of the second partition wall 28.

In the exemplary sealing member 5 shown in FIGS. 3 to 6, the sealing outer cylinder 7 and the sealing partition member 8 are shown as formed in an integral unit with the respective outer edges of the first partition wall 27 and the second partition walls 28 joined to the inside surface 19 of the outer cylinder 7.

Reference numeral 32 indicates a protective rubber cover, engaging with the protrusion 18 of the sealing outer cylinder 7 and covering the electric cables 3, which defines the direction of lead-out of the electric cables.

A method for connecting the electric cables 2, 3 by using the above-mentioned sealing member 5 is explained hereinafter.

The other end of each of the three electric cables 2, which is electrically connected at one end, for example, to an electrical device which operates within the housing of hydraulic machinery, is led out through the hole 4 formed in the lead-out portion of the housing 1, is passed through the through hole 11 of the plug member 9, respectively, and is stripped to expose the copper wires 13.

The other end of each of the three electric cables 3, which is electrically connected at one end, for example, to a controller disposed outside of the housing 1, is passed through the rubber cover 32 and the through hole 11 of the plug member 10, respectively, then inserted into the outer cylinder 7 of the sealing member 5 through one opening end thereof and is passed further through the through hole 30 of the first partition wall 27, respectively, and through the corresponding one of the three spaces defined by the second partition walls 28, the outer circumference 26 of the short cylinder 24 and the inside surface 19 of the outer cylinder 7, respectively, and finally is led out from the other opening end of the outer cylinder 7. The end portion of the electric cable 3 is stripped to expose the copper wires 13.

The respective copper wires 13 of the corresponding electric cables 2,3 are inserted into the C-shaped joint terminal 14 formed of a metal plate and are interconnected by crimping the joint terminal 14.

The electric cables 3 connected to the controller are pulled to draw the joint terminals 14 joining the electric cables 2,3 into the outer cylinder 7. When the joint terminals 14 are drawn into the outer cylinder 7, the joint terminals 14 stays in the space defined by the second partition walls 28, the short cylinder 24 and the outer cylinder 7, because the sectional size of the joint terminals 14 is designed so that the joint terminals 14 cannot pass through the through holes 30 of the first partition wall 27.

The plug member 9, holding the electric cables 2 connected to the electrical device which operates within the housing 1 by the through holes 11, is fitted in the opening of the outer cylinder 7 of the sealing member 5 until one end surface of the plug member 9 is brought into abutment with the stopper portions 29 of the second partition walls 28. Then, it is preferable to adjust the position of the joint terminals 14 to an intermediate position between the first partition wall 27 and the plug member 9. The outer circumference of the plug member 9 is in elastic and liquid-tight engagement with the inside surface 19 of the outer cylinder 7. The stopper portions 29 serve to form a small space between the plug member 9 and the short cylinder 24.

A filler made of an excellently insulating, heat-resisting and oil-resisting synthetic resin, such as epoxy resin or silicone resin, is poured into the axial center bore 25 in a well fluidized state through one opening end of the short cylinder 24 located at the upper portion of the sealing member 5 while the sealing member 5 is held with its axis in a vertical position. The filler 6 which is poured into the axial center bore 25 flows through the other opening end of the axial center bore 25 into the space defined between the plug member 9 and the short cylinder 24, then into the three spaces defined by the second partition walls 28 and the outer circumference 26 of the short cylinder 24 of the sealing partition member 8 and the inside surface 19 of the outer cylinder 7. Thereby the end portions of the electric cables 2,3, the copper wires 13 and the junctions formed by the joint terminals 14, which are disposed in the space between the sealing outer cylinder 7 and sealing partition member 8, are buried in the filler 6 and the space is filled up with the filler 6.

The openings 31 formed in the first partition wall 27 allow air to be discharged therethrough from the space between the short cylinder 24 and the plug member 9 when the filler 6 is poured to fill up the space to prevent the formation of bubbles in the filler 6. After the space between the plug member 9 and the first partition wall 27 has been filled up with the filler 6, the surplus filler flows through the openings 31 and gaps between the through holes 30 and the electric cables 3 from the first partition wall 27 into the opening end of the outer cylinder 7. When the amount of filler 6 entered the opening end reaches a certain appropriate value, the supply of the filler 6 is interrupted and the surface of the filler 6 contained in the opening end is shaped in a plane practically perpendicular to the center axis of the inside surface 19 of the outer cylinder 7. Then the plug 10 is fitted in the opening end immediately or the plug 10 is fitted in after the filler 6 has been solidified. The appropriate amount of the filler 6 to be supplied into the opening end of the outer cylinder 7 is an amount which is sufficient to submerge the stopper portions 29 in the filler 6 when the surface of the filler is shaped as described hereinbefore.

After the filler 6 has been solidified, the sealing member 5 is fitted in the hole 4 formed in the lead-out portion of the housing 1 with the circumferential fitting portion 17 of the outer cylinder 7 in liquid-tight engagement with the hole 4, and the rubber cover 32 is attached to the outer cylinder 7.

In the drawings, reference numeral 33 designates positioning projections formed integrally in the outer cylinder 7 for use in fitting the sealing member in the hole 4 of the housing 1.

The connecting and sealing device of the present invention formed as described hereinbefore is capable of perfectly sealing the electric cable lead-out portion to prevent leakage of hydraulic fluid contained in the housing, since the electric cables 2, each connected at one end thereof to the electrical device which operates within the housing 1, are passed through the through holes 11 of the plug member 9 in a liquid-tight manner into the interior of the outer cylinder 7 of the sealing member 5 and are electrically connected to the corresponding ends of electric cables 3, each connected at the other end thereof to the controller, by means of the joint terminals 14 within the space defined by the inside surface 19 of the outer cylinder 7, the outer circumference 26 of the short cylinder 24 and the second partition walls 28 of the sealing partition member 8. Gaps between the coatings and the component copper wires 13, and gaps between the copper wires 13 and the space around the joint terminals 14 are filled with a filler 6 filling up at least the space between the plug member 9 and the first partition wall 27. Thereby movement of the hydraulic fluid within the electric cables 2 is intercepted by the filler 6 if the hydraulic fluid should move within the electric cables 2 due to capillarity, so that the hydraulic fluid will not be transmitted to the electric cables 3 extending outside of the housing. The three junctions between the electric cables 2 and electric cables 3 are well insulated from each other and the sealing member 5, filled with the filler 6, closes the hole 4 formed in the housing 1 in a liquid-tight manner.

FIGS. 8 and 9 show another embodiment of the present invention, wherein the constructions of parts designated by reference numerals which are the same as those used in FIGS. 1 to 7 are the same as the constructions of the parts shown in FIGS. 1 to 7, except that a sealing member 50 comprises an outer cylinder 70 having an annular protrusion of small height radially protruding from the inner circumference thereof and a sealing partition member 80, which are formed separately. The sealing partition member 80 is fitted in the outer cylinder 70 with the free edges of the first partition wall 27 and the second partition walls 28 in fitting engagement with the inside surface 19 of the outer cylinder 70 and is positioned by means of the annular protrusion 71.

A simple description of the method of connecting the electric cables 2,3 by means of the sealing member 50 is provided hereunder with omission of description of a part of the method, since the part which is not described hereunder will be understood from the description which is provided referring to FIG. 1.

Three electric cables 2, each electrically connected at one end thereof to an electrical device, are passed through the through holes 11 of the plug member 9 and are stripped to expose the copper wires 13.

Three electric cables 3, each electrically connected at one end thereof to a controller, are introduced into one opening end of the sealing outer cylinder 70, formed practically as a hollow cylinder. The cables 3 are drawn out from the other opening of the outer cylinder 70 and then passed through the holes 30 of the first partition wall 27 of the sealing partition member 80. The other end of each of the electric cables 3 is stripped to expose the copper wires 13. The electric cables 2,3 are electrically connected by means of the joint terminals 14 as described above.

The junctions between the electric cables 2,3 formed by the joint terminals 14 are disposed within the corresponding spaces between the second partition walls 28 of the sealing parition member 80. The sealing outer cylinder 70 is moved along the circumference of the sealing partition member 80 until the annular protrusion 71 is brought into abutment with the stopper portions 29 of the second partition walls 28, so that the sealing outer cylinder 70 and the sealing partition member 80 are joined together with the free edges of the first partition wall 27 and the second partition walls 28 in fitting engagement with the inside surface 19 of the outer cylinder 70.

The plug member 9 is elastically fitted in the opening of the outer cylinder 70 until the plug member 9 comes into abutment with the stopper portions 29 of the second partition wall 28 and is held there elastically.

The fluidized filler 6 is poured through the open end of the short cylinder 24 to fill up at least a space formed within the outer cylinder 70 between the plug member 9 and the first partition wall 27 of the sealing partition member 80. The filler 6 fills up spaces around the junctions between the electric cables 2,3 formed with the joint terminals 14, and the space between the plug member 9 and the first partition wall 27. The filler 6 also flows into and fills up gaps remaining in the engaging parts between the outer cylinder 70 and the sealing partition member 80 so that the outer cylinder 70 and the sealing partition member 80 are firmly joined together when the filler 6 is solidified.

The method employing the sealing member 50 is the same as the method employing the sealing member 5 except that the electric cables 3 can be passed through the holes 30 of the first partition wall 27 of the sealing partition member 80 in sight. Also, the positioning of the junctions between the electric cables 2,3 formed with the joints 14 in the respective central portions between the second partition walls 28 can be attained easily as compared with those steps in the method employing the sealing member 5. Further, the construction of the connecting and sealing device completed by use of the sealing member 50 is practically the same as that completed by use of the sealing member 5.

Figure 10:
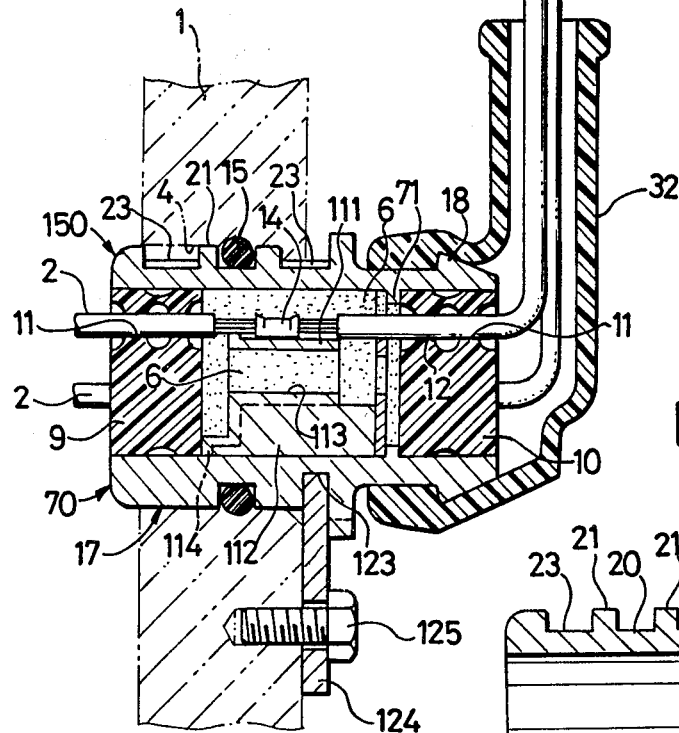
FIG. 10 is an axial sectional view of still another embodiment of a cable connecting device in accordance with the invention.
Figure 11:
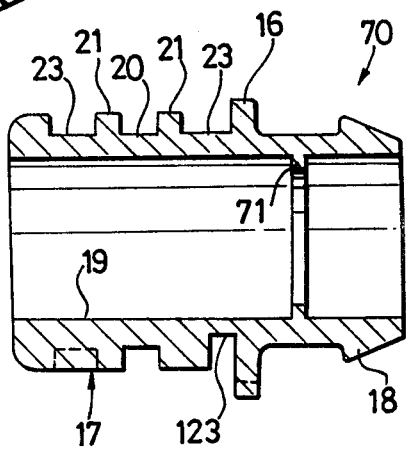
FIG. 11 is an axial sectional view of the outer cylinder of the sealing member of FIG. 10, and FIG. 12 are exploded perspective views of sealing partition members.
Figure 12:
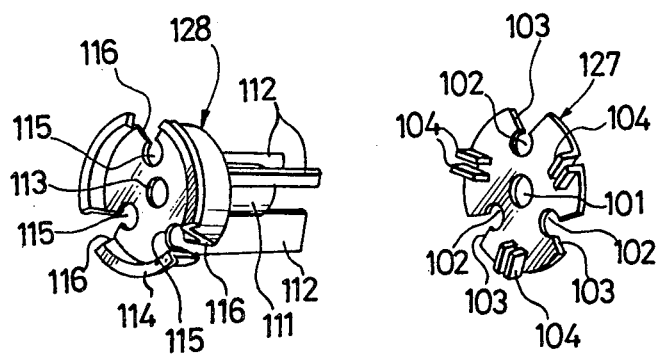

FIGS. 10 to 12 show still another embodiment of a device for connecting electric cables in accordance with the invention. In this embodiment, a sealing member 150 comprises a sealing outer cylinder 70, a first sealing partition member 127 and a second sealing partition member 128, which are formed separately. The outer cylinder 70 has a construction as shown in FIG. 11, which is identical with that of the outer cylinder 70 shown in FIG. 8.

The sealing partition members 127,128 are made of the same material as that of the outer cylinder 70. The first sealing partition member 127 assumes generally the shape of an annular plate having a center hole 101, three holes 102 distributed about the circumference thereof practically at equal angular intervals, recesses 103 formed in the circumference thereof and cutting into the corresponding holes 102, and three pairs of radially parallel plate-shaped protrusions 104, extending perpendicularly to the plate portion thereof. The second sealing partition member 128 integrally includes three plate-shaped radial partition walls 112 extending from the outer circumference of a short cylinder 111 with the corresponding planes including the center axis of the short cylinder 111 and arranged at equal angular intervals, a dish-shaped disk 114 joined to the short cylinder 111 at one end of the short cylinder 111 practically perpendicularly to the center axis of the short cylinder 111, three holes 115 formed in the dish-shaped disk 114 along the circumference at practically equal angular intervals, and recesses 116 formed in the circumference of the dish-shaped disk 114 and cutting into the corresponding holes 115.

A simple description of the method of connecting the electric cables 2,3 by the use of the sealing member 150 will be provided hereunder. Three electric cables 3, each connected at one end thereof to the controller, are passed through the through holes 11 of a plug member 10 and then, through one open end of the outer cylinder 70 having opposite open ends to draw out the respective other ends of the electric cables 3 into the other open end of the outer cylinder 70. Then the other ends of the electric cables 3 are stripped to expose the copper wires 13.

Three electric cables 2, each connected at one end thereof to the electrical device, is passed through the through holes 11 of the plug member 9 and the respective other ends of the electric cables 2 are stripped to expose the copper wires 13. The electric cables 2,3 are electrically connected by fastening the corresponding copper wires 13 together with the joint terminals 14 by crimping the joint terminals 14.

Each electric cable 3 is fitted in the hole 102 through the recess 103 of the first sealing partition member 127, while each electric cable 2 is fitted in the hole 115 through the recess 116 formed in the dish-shaped disk 114 of the second sealing partition member 128. Then, the first sealing partition member 127 and the second sealing partition member 128 are assembled by firmly inserting each end of the partition wall 112 of the second sealing partition member 128 into the gap between a pair of the plate-shaped protrusions 104 so as to dispose each electrical junction formed with one joint terminal 14 in the space between the adjacent partition walls 112.

The assembly of the first sealing partition member 127 and the second sealing partition member 128 is inserted into the cavity of the outer cylinder 70 through one open end (the left-hand opening end in FIG. 10) of the outer cylinder 70 so deeply that the first sealing partition member 127 is brought into abutment with the annular protrusion 71. When the assembly is firmly inserted into the cavity of the outer cylinder 70, the outer circumference of the first sealing partition member 70, and the rim of the dish-shaped disk 114 and the edges of the partition walls 112 of the second sealing partition member 128 are in internal contact with the inside surface 19 of the outer cylinder 70.

The plug member 9 is pushed into the open end (left end in FIG. 10) of the outer cylinder 70 so deeply as to be in abutment with the end surfaces of the dish-shaped plate 114 of the second sealing partition member 128, and is elastically held there.

The fluidized filler 6 is poured into the space between the plug member 9 and the dish-shaped plate 114 from the center hole 101 of the first sealing partition member 127 through the center bore 113 of the short cylinder 111 of the second sealing partition member 128. The filler 6 thus poured into the space is allowed to flow into spaces around the junctions between the copper wires 13 formed with the joint terminals 14 and through the recesses 115 of the dish-shaped disk 114 to fill up the space defined by the short cylinder 111, the inside surface 19 of the outer cylinder 70 and the partition walls 112. When at least the space between the plug member 9 and the first sealing partition member 127 within the outer cylinder 70 is filled with the filler 6, the supply of filler 6 is interrupted. After the filler 6 filled in the space has been solidified, the first sealing partition member 127, the second sealing partition member 128 and the sealing outer cylinder 70 are joined integrally and the junctions between the copper wires 13 formed with the joint terminals 14 are buried within the filler 6.

The use of the sealing member 150 for sealing and connecting electric cables facilitates the work remarkably, since the electric cables 2,3 are connected with the joint terminals 14 in sight. The first sealing partition member 127 and the second sealing partition member 128 are assembled after the electric cables 2,3 have been connected and received in the sealing partition members 127,128. Then, the assembly of the first sealing partition member 127 and the second sealing partition member 128 is inserted into the outer cylinder 70.

It will thus be understood from what has been described in detail that, in accordance with the present invention, two separate electric cables, one submerged in a hydraulic fluid within a housing and the other extended outside of the housing, are used instead of a single continuous electric cable, for example, for connecting an electrical device which operates within the housing and a controller which is located outside of the housing and is adapted to control the electrical device. Those two electric cables are electrically connected in the interior of a sealing member which is attached in a hole formed in the electric cable lead-out portion of the housing is a liquid-tight manner. The electric cables extended outside of the housing may be inexpensive electric cables, such as ordinary polyethylene cables, in practical applications, even though electric cables, such as Teflon cables which are superior in oil-resisting and heat-resisting properties, but expensive, have to be used for the electric cables which are used within the housing. The hydraulic fluid is not allowed to leak out from the housing into the sealing member and still more, is not allowed to be transmitted to the controller through the electric cable extending outside of the housing. There is no leakage through the cable since the respective joining ends of those electric cables are stripped off for electrical connection and the space around the junction of the electric cables is filled with an insulating, oil-resisting and heat-resisting synthetic resin filler so that gaps between the coating and the copper wires and between the copper wires, per se, are filled up with the filler, even if the hydraulic fluid permeate the electric cable arranged within the housing due to capillarity.

Furthermore, usually the electrical device and the controller are connected with a plurality of electric cables. Consequently, a plurality of junctions are formed within the sealing member for connecting the electric cables arranged within the housing and the electric cables arranged outside of the housing. Therefore, it is necessary to dispose the plurality of junctions within the sealing member in order and to insulate the junctions from each other. In accordance with the present invention, predetermined number of holes corresponding to the number of the electric cables are formed both in the first partition wall of the sealing partition member and in the plug member around the respective center axis at equal circumferential intervals and the electric cables arranged outside and inside of the housing are electrically connected after they are passed through those holes. Further, the junctions are disposed one in each of spaces formed by partitioning a space between the short cylinder of the sealing partition member and the outer cylinder into a predetermined number of spaces with a predetermined number of the second partition walls formed radially in the sealing partition member. Therefore, a number of electric cables are prevented from intersecting one another and the junctions are separately buried in the filler. Hence, the electric cables are effectively insulated and are firmly held by the sealing member.

Furthermore, since the short cylinder is formed practically in the center of the sealing partition member, the plug member is inserted in the sealing outer cylinder and is held there with a short distance from one end of the short cylinder. The filler is poured into the sealing outer cylinder from the other end of the short cylinder through the axial center hole of the short cylinder. The filler first flows into and fills up the space between the short cylinder and the plug member and then, flows into and fills up the spaces which are defined by the second partition walls of the sealing partition member, the outer circumference of the short cylinder and the inside surface of the sealing outer cylinder and containing the junctions of the electric cables. As the filler is poured in the sealing outer cylinder, the air contained within those spaces is allowed to be discharged through gaps between the holes formed in the first partition wall and the electric cables and additional air vents. Therefore, air will not remain within the filler. Hence, pin holes, which cause leakage of the hydraulic fluid, will not be formed in the filler. Still further, since the filler also fills up the axial center hole, the cavity of the sealing member, at least the space between the plug member and the first partition wall is filled with the filler to prevent the leakage of the hydraulic fluid through the cavity of the sealing member.

In connecting the electric cables at the corresponding ends thereof in accordance with the invention, the joint terminals can be positioned at positions adjacent to the first partition wall by pulling the electric cables which are passed through the holes of the first partition wall, when the electric cables are joined by crimping joint terminals having a shape which will not pass through the holes of the first partition wall of the sealing petition member.

Furthermore, the construction of the sealing member with the sealing outer cylinder and the sealing partition member which are formed separately, allows the positioning of the junctions of the electric cables in sight to be visible.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An electric cable connecting and sealing device in a hydraulic system, for electrically connecting the free ends of a predetermined number of electric cables each connected electrically at one end thereof to a first electrical device which operates in the housing of hydraulic machinery used in sid hydraulic system and the corresponding free ends of a predetermined number of electric cables each connected electrically at one end thereof to a second electrical device disposed outside of said housing, at the electric cable lead-out portion of said housing, comprising:

a sealing outer cylinder formed generally in the shape of a hollow cylinder having opposite open ends, and adapted to fit without leakage in a hole formed in the electric cable leading-out portion of said housing, a sealing partition member comprising a short cylinder of an axial length shorter than that of said sealing outer cylinder, formed in the shape of a hollow cylinder having opposite open ends and disposed in said sealing outer cylinder, an annular first partition wall formed at one axial end of said short cylinder perpendicularly to the center axis of said short cylinder so as to connect the inside surface of said sealing outer cylinder and the outer circumference of said short cylinder, and second partition walls of a predetermined number extending radially of said short cylinder, said second partition walls being provided with short stopper portions extending axially at least from one end of said short cylinder and said first partition wall being provided through holes for receiving said electric cables therethrough, and plug members formed of an elastic material, such as soft rubber or a synthetic rubber, generally in the shape of a cylinder capable of being closely fitted in the open ends of said sealing outer cylinder and having through holes of a predetermined number, one of said plug members being inserted into one open end of said sealing outer cylinder with either of said electric cables connected to said first electrical device or said electric cables connected to said second electrical device passed through the through holes and held elastically by said sealing outer cylinder at a position where said plug is in abutment with said stopper portions formed in the second partition walls of said sealing partition member, the free ends of said electric cables extending through the through holes of said plug member and through the holes formed in the first partition wall of said sealing partition member so as to be positioned within the respective spaces defined by said second partition walls, said sealing outer cylinder and said short cylinder, the junctions between said electric cables and other electric cables inserted into said sealing outer cylinder from the other open end thereof being disposed within said spaces defined by said second partition walls, said outer cylinder and said short cylinder, and at least a space defined by said plug member and said first partition wall within the cavity of said sealing outer cylinder and the center bore of the short cylinder of said sealing partition member are filled with a filler.

2. An electric cable connecting and sealing device in a hydraulic system as claimed in claim 1, wherein the free ends of the electric cables connected at each one end thereof to said first electrical device and those of the electric cables connected at each one end thereof to said second electrical device are stripped and are connected electrically by plate-shaped joint terminals made of metal plates, and the holes formed in the first partition wall of said sealing partition member are formed in a shape allowing the passage of said electric cables therethrough, whereas obstructing the passage of said joint terminals.

3. An electric cable connecting and sealing device in a hydraulic system as claimed in claim 1, wherein air vent holes are formed in the first partition wall of said sealing partition member along the periphery connecting to the inside surface of said outer cylinder.

4. An electric cable connecting and sealing device in a hydraulic system as claimed in claim 1, wherein said sealing partition member integrally comprises said short cylinder and said first and second partition walls, said sealing partition member and said sealing outer cylinder are formed separately, and said sealing partition member is fitted within said outer cylinder by means of the end portions of said first partition wall and said second partition walls, which are positioned far from the center axis of said short cylinder.

5. An electric cable connecting and sealing device in a hydraulic systems as claimed in claim 4, wherein recesses opening in the periphery of said sealing partition member are formed at the respective portions of the through holes formed in said sealing partition member for receiving electric cables therethrough.

6. An electric cable connecting and sealing device in a hydraulic system as claimed in claim 1, wherein said short cylinder is disposed in the vicinity of the center axis of said sealing outer cylinder, said second partition walls extend radially from said center axis of said short cylinder and includes said center axis, said second partition walls being at equal circumferential intervals around said short cylinder, said through holes in said plug members being formed in parallel with the center axis of said plug member at practically equal circumferential intervals.

7. An electronic cable connecting and sealing device in a hydraulic system as claimed in claim 1, wherein said filler is an insulating, oil-resisting and heat resisting synthetic resin.

8. An electronic cable connecting and sealing device in a hydraulic system as claimed in claim 1 or 6, and further comprising a flange on said sealing outer cylinder radially protruding from the outer circumference thereof and a fitting circumferential portion formed on the outer circumference thereof on one side of said flange.

9. An electric cable connecting and sealing device in a hydraulic system comprising:
  a sealing outer cylinder formed in the shape of a hollow cylinder with opposite open ends and a generally cylindrical cavity;
  a first sealing partition member having an outer circumference capable of fitting in the cavity of said outer cylinder within a plane perpendicular to the center axis of said outer cylinder, a center hole, a predetermined number of holes arranged around said center hole practically at equal circumferential intervals for receiving electric cables therethrough and recesses opening the respective parts of said holes in said circumference;
and
  a second sealing partition member having a hollow cylindrical short cylinder of a small diameter and of an axial length shorter than that of said sealing outer cylinder, a dish-shaped plate attached on the outer circumference and at one end of said short cylinder perpendicular to the center axis of said short cylinder, a predetermined number of plate-shaped partition walls extending from the outer circumference of said short cylinder within planes including the center axis of said short cylinder practically at equal circumferential intervals, a predetermined number of holes formed in said dish-shaped plate between said partition walls and around the center axis practically at equal circumferential intervals for receiving the electric cables therethrough, and recesses formed at the respective portions of said holes formed in said dish-shaped plate and opening said holes in the periphery of said dish-shaped plate, and a predetermined number of retaining portions being provided on the peripheral portion of said first partition member, each consisting of a pair of plate-shaped protrusions, for retaining the extremities of said plate-shaped partition walls of said second sealing partition members, and an annular protrusion being formed in the cavity of said outer cylinder in a plane perpendicular to the center axis for receiving said first sealing partition member.

10. In a method for electrically connecting the free ends of a predetermined number of electric cables each connected at one end thereof to a first electrical device which operates within the housing of hydraulic machinery and the free ends of a predetermined number of electric cables each connected at one end thereof to a second electrical device disposed outside of the housing, said connection being made at the electric cable lead-out portion of the housing, the method comprising the steps of:
  passing the free ends of either said cables connected to said first electrical device or said cables connected to said second electrical device through a predetermined number of through holes, respectively, which are formed in a plug member formed practically in a cylindrical shape from an elastic material such as soft rubber or a synthetic rubber;
  passing the free ends of the other electrical cables through a sealing member integrally comprising a sealing outer cylinder formed in the shape of a holllow cylinder and open at the opposite ends, and a sealing partition member consisting of a short cylinder of small diameter disposed in said outer cylinder, said short cylinder being open at the opposite ends and having an axial length shorter than that of said outer cylinder, an annular first partition wall disposed at one axial end of said short cylinder in a plane practically perpendicular to the center axis of said short cylinder for connecting the inside surface of said outer cylinder and the outside surface of said short cylinder, and a predetermined number of second partition walls disposed radially of said center axis, from one open end of said outer cylinder through holes formed in said first partition wall and spaces formed between said second partition walls to make the free ends of the electric cables project outside of the other open end of said outer cylinder;
  stripping a portion of the coatings off at the respective free ends of both electric cables and electrically connecting the corresponding exposed ends of both electric cables,
  inserting said plug member in one open end of said outer cylinder axially of said outer cylinder so deeply that only a small space remains between said plug member and one end of said short cylinder of said sealing partition member, and making the outer circumference of said plug member elastically engage with the inside surface of said outer cylinder, positioning the junctions between the corresponding electric cables in the respective spaces formed by partitioning a space between said outer cylinder and said short cylinder with said second partition walls, pouring a fluidized filler from one open end of said short cylinder into and through the axial central bore of said short cylinder for filling spaces around the junctions between said corresponding electric cables with said filler and making said filler flow at least into a cavity defined by said plug member and said first partition wall within said outer cylinder for filling up said cavity with said filler, and attaching said sealing member in a liquid-tight manner to a hole formed in the electric cable lead-out portion of said housing through the engagement of the outer circumference of said outer cylinder with the inside surface of said hole, after the filler has been solidified.

11. In a method for electrically connecting the free ends of a predetermined number of electric cables each connected at one end thereof to a first electrical device which operates within the housing of hydraulic machinery and the free ends of a predetermined number of electric cables each connected at one end thereof to a second electrical device disposed outside of the housing, said connection being made at the electric cable lead-out portion of the housing, the method comprising the steps of:

passing the free ends of either said cables connected to said first electrical device or said cables connected to said second electrical device through a predetermined number of through holes, respectively, which are formed in a plug member formed practically in a cylindrical shape from an elastic material such as soft rubber or a synthetic rubber;

inserting the free ends of either said cables connected to said first electrical device or said cables connected to said second electrical device from one open end of and through a sealing outer cylinder formed in the shape of a hollow cylinder and open at the opposite ends and making the free ends of said cables project from the other open end of said outer cylinder, passing the free ends of the other electric cables through a sealing partition member integrally comprising a hollow cylindrical short cylinder formed in an axial length shorter than that of said outer cylinder and open at the opposite ends, an annular first partition wall formed on the circumference of said short cylinder at one axial end in a plane practically perpendicular to the center axis of said short cylinder, and second partition walls formed radially of said center axis, and through holes formed in said first partition wall, stripping a portion of the coating off at the respective free ends of both electric cables and electrically connecting the free ends of ones of said electric cables and the corresponding free ends of the others of said electric cables, axially inserting said sealing partition member into one open end of said sealing outer cylinder and then inserting said plug member into said open end of said outer cylinder so that the outer circumference thereof is elastically engaged with the inside surface of said outer cylinder and the end portion of said short cylinder of the sealing partition member is positioned at a short distance from said plug member, positioning the junctions between the corresponding electric cables in the respective spaces formed by partitioning a space between said sealing outer cylinder and said sealing partition member, pouring a fluidized filler from one opening end of said short cylinder into and through the axial center bore of said short cylinder for filling spaces around the junctions between said corresponding electric cables and gaps between said sealing outer cylinder and said sealing partition member, with said filler, and attaching said sealing member in a liquid-tight manner to a hole formed in the electric cable lead-out portion of said housing through the engagement of the outer circumference of said sealing outer cylinder with the inside surface of said hole, after the filler has been solidified.

12. In a method for electrically connecting the free ends of a predetermined number of electric cables each connected at one end thereof to a first electrical device which operates within the housing of hydraulic machinery and the free ends of a predetermined number of electric cables each connected at one end thereof to a second electrical device disposed outside of the housing, said connection being made at the electrical cable lead-out portion of the housing, the method comprising the steps of:

passing the free ends of either said cables connected to said first electrical device or said cables connected to said second electrical device respectively through a predetermined number of through holes formed in a plug member made of an elastic material such as soft rubber or a synthetic rubber practically in a cylindrical shape;

inserting the free ends of the other of said electric cables into a sealing outer cylinder formed practically in a cylindrical shape and opened at the opposite ends, from one open end of said outer cylinder and passing said free ends through said outer cylinder to make said free ends project from the other open end of said outer cylinder, stripping a part of the coating off at the free ends of both electric cables and electrically connecting the free ends of ones of said electric cables and the corresponding free ends of the others of said electric cables, fitting the others of said electric cables in recesses formed in a first sealing partition member of a generally annular disk having a hole, and said recesses of a predetermined number being formed along the periphery of said first sealing partition member, and fitting ones of said electric cables in recesses formed in a second sealing partition member integrally comprising a short cylinder having a bore concentric with said hole of said first sealing partition member, an annular dish-shaped plate formed at one end of said short cylinder practically perpendicularly to the center axis of said short cylinder, and a predetermined number of partition walls extending from the outer circumference of said short cylinder, and provided with said recesses along the periphery of said dish-shaped plate respectively, inserting the assembly of said first sealing partition member and said second sealing partition member into the cavity of said sealing outer cylinder through said other open end thereof with said fist sealing partition member engaged with the edges of the partition walls of said second sealing partition member and with the junctions formed between said corresponding electric cables disposed one in each space between two adjacent partition walls, axially inserting said plug member, through which said ones of said electric cables are passed, into said other open end of said outer cylinder so as to dispose said plug member at a position where said plug member is separated axially by a distance from the end of said short cylinder of said second sealing partition member and to make the outer circumference of said plug member engage elastically with the inside surface of said outer cylinder, pouring a fluidized filler through the hole of said first sealing partition member and through the bore of the short cylinder of said second sealing partition member to make said filler flow out from the other end of the bore of said short cylinder and through gaps between said plug member and said short cylinder to fill a space around the junctions formed between said electric cables, and to flow into and fill at least the cavity of said outer cylinder defined by said plug member and said first sealing partition member, and attaching said sealing member in a liquid-tight manner to a hole formed in the electric cable lead-out portion of said housing through the engagement of the outer circumference of said sealing outer cylinder with the inside surface of said hole, after the filler has been solidified.

13. A method as claimed in claim 10, wherein said short cylinder is disposed practically concentrically with and in the vicinity of the center axis of said outer cylinder.

14. A method as claimed in claim 11, 12 or 13, wherein said through holes are in parallel to the center axis of said plug member, said second partition walls being in planes including the center axis of said short cylinder, and said through holes in said partition walls being at equal circumferential intervals relative to the center axis of said plug member.

15. A method as claimed in claim 10, 11 or 12, wherein said filler is an insulating, oil-resisting and heat resisting synthetic resin.

16. A method as claimed in claim 12, wherein said hole in said generally annular disk is a center hole and said recesses are spaced along the periphery of said first sealing partition member at equal circumferential intervals, said short cylinder having a center bore concentric with the center hole of said first sealing partition member, and said recesses along the periphery of said dish-shaped plate being practically at equal circumferential intervals.

* * * * *